United States Patent

Faulkner

[15] 3,690,105
[45] Sept. 12, 1972

[54] AFTER BURNING DEVICE FOR INTERNAL COMBUSTION ENGINES

[72] Inventor: Bonnie G. Faulkner, 15818 Beechwood, Ivanhoe, Calif. 93235

[22] Filed: April 8, 1971

[21] Appl. No.: 132,488

Related U.S. Application Data

[63] Continuation-in-part of Ser. No. 725,728, May 1, 1968, abandoned.

[52] U.S. Cl. ..................60/283, 60/306, 60/308, 60/293
[51] Int. Cl. ..............................F02b 75/10
[58] Field of Search........60/283, 293, 304, 305, 306, 60/307, 308

[56] References Cited

UNITED STATES PATENTS

| 939,844 | 11/1909 | Lehmann | 60/304 |
|---|---|---|---|
| 2,217,241 | 10/1940 | Tendter | 60/305 |
| 2,263,318 | 11/1941 | Tifft | 60/306 |
| 3,058,299 | 10/1962 | Dean | 60/307 |
| 3,091,078 | 5/1963 | Dworak | 60/304 |
| 3,113,418 | 12/1963 | Campbell | 60/304 |
| 3,335,564 | 8/1967 | Hines | 60/305 |

FOREIGN PATENTS OR APPLICATIONS

| 435,780 | 9/1935 | Great Britain | 60/307 |

*Primary Examiner*—Douglas Hart
*Attorney*—Vergil L. Gerard

[57] ABSTRACT

This disclosure described apparatus which substantially reduces the uncombusted hydrocarbons in the exhaust gases from an internal combustion engine by causing further combustion in the manifold of the engine adjacent the cylinder exhaust valves. The further combustion is derived by injecting additional oxygen into contact with the hot exhaust gases. The oxygen is injected by means of a supply tube inserted coaxially in the manifold collection chamber with venturi ports which draw in air from the outside. In alternate forms, air is drawn from the engine oil pan area through the oil breather cap, and from both the atmosphere and the oil pan area, simultaneously.

8 Claims, 6 Drawing Figures

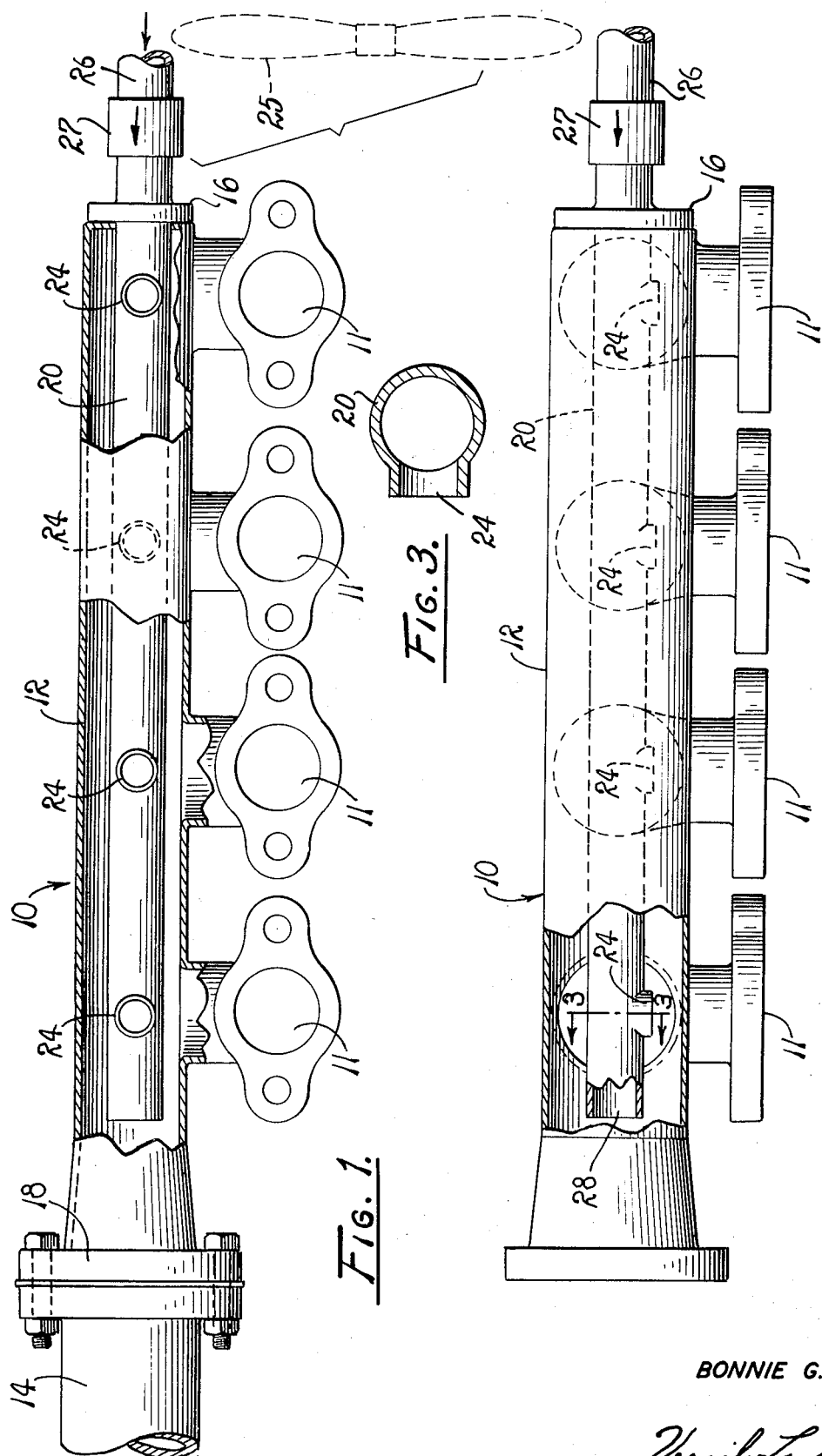

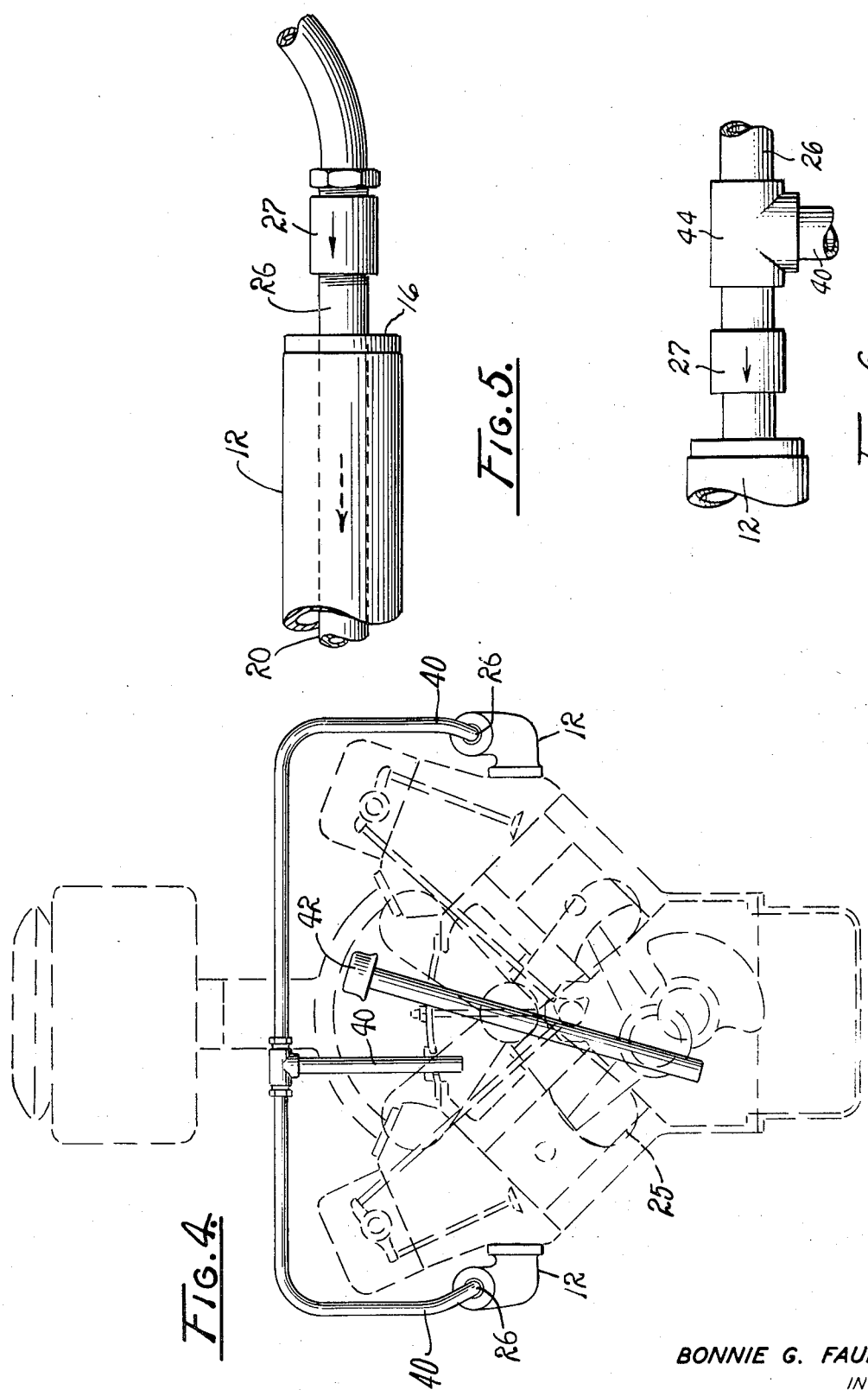

AFTER BURNING DEVICE FOR INTERNAL COMBUSTION ENGINES

This application is a continuation-in-part of application Ser. No. 725,728 filed by applicant on May 1, 1968, now abandoned, and entitled After-Burning Device for Internal Combustion Engines.

This invention relates to an improved method and apparatus for achieving more complete combustion of exhaust gases from an internal combustion engine, and more particularly relates to an improvement in devices which effect further combustion of the hydrocarbon fuel mixture as it passes from the cylinder exhaust valves of an internal combustion engine into the exhaust manifold.

One of the purposes and advantages of the present invention over the prior devices is to provide substantially complete combustion and avoid the outflow from the engine exhaust of uncombusted hydrocarbon irritants that tend to produce smog and other disadvantageous products.

A further object of the invention is to provide a device for internal combustion engines that effects combustion of unburned portions of the fuel mixtures still present in the exhaust gases as they are ejected from the cylinders into the exhaust manifold.

Still another object of the present invention is to provide apparatus for effecting further combustion of the unburned fuel mixture by providing a supply of oxygen for mixture with the gases as they are exhausted from the engine cylinders.

Yet a further object of this invention is to provide a device of the type described in which the oxygen is supplied by air drawn into the manifold by venturi effect.

It is still another object of this invention to provide a device of the type described in which a tube is installed co-axially in the collection chamber of the exhaust manifold of an internal combustion engine with one end of the tube in communication with the outside air to provide a flow of outside air into the manifold which mixes with the exhaust gases to cause further and more complete combustion of the unburned portion of fuel in the exhaust system.

These and other objects of advantages of this invention will become more apparent from the following detailed description and the appended drawings in which:

FIG. 1 is a side elevational view of a preferred embodiment of my invention with portions of the exhaust manifold of an internal combustion engine broken away;

FIG. 2 shows a plan view of the embodiment shown in FIG. 1;

FIG. 3 is a cross-sectional view taken on line 3—3 in FIG. 2;

FIG. 4 is a sectional end elevational view of an alternate form of my invention shown on an internal combustion engine; and FIG. 5 is an enlarged partial side elevational view showing a portion of the alternate form of my invention;

FIG. 6 is a partial side elevational view of still a further form of my invention.

Referring now to the drawings, and particularly FIGS. 1 and 2 thereof, the numeral 10 designates generally an improved manifold for an internal combustion engine which incorporates the features of my invention. The manifold 10 has a plurality of intake ports 11 which connect to the cylinder block of the engine adjacent the cylinder exhaust valves. The intake ports 11 are disposed in communication with and at right angles to an elongated collection chamber 12 which is, in turn, connected to an exhaust pipe 14 by means of a coupling 18.

A tube 20 is disposed coaxially with the collection chamber 12 and extends through the closed end 16 of the collection chamber. The tube 20 is sealed to the closed end 16 of the collection chamber 20 and extends beyond the closed end to form an air intake port 26. The air intake port 26 is open to the atmosphere and is preferably directed forwardly with respect to the vehicle in which the internal combustion engine is used and positioned just behind the cooling fan 25 of the engine, so that the air draft from the fan is directed into the port.

Opposite each of the intake ports 11, the tube 20 has output nozzles 24. The nozzles 24 are disposed at right angles to the direction of travel of the engine exhaust gases along the collection chamber 12. The tube 20 is also open at its inner end 28 which is disposed near the connection of the chamber 12 with the exhaust pipe 14. To prevent the escape of exhaust gases through the tube 20, a one-way check valve 27 is located in the air intake port 26.

In operation, air is drawn into the port 26 of the tube 20 by the low pressure created in the tube 20 by venturi effect, assisted by motion of the vehicle and by the draft of the cooling fan, and passes along the tube 20 inside the collection chamber 12 where it is heated from the hot exhaust gases of the engine. Opposite each of the input ports 11 the air exits from the tube 20 through the output nozzles 24 and mixes with the hot gases from the engine cylinders. Because of the high percentage of oxygen in the air this mixture causes further combustion of the unburned fuel in the exhaust gases, thus eliminating undesirable hydrocarbons from the exhaust gases which proceed out of the engine exhaust 14.

Since the tube 20 is open at its inner end 28 and the output nozzles 24 are directed at right angles to the flow of the exhaust gases through both the input ports 11 and the collection chamber 12, a low pressure area is created at the nozzles 24 by venturi effect.

This venturi effect greatly increases the supply of air through the tube 20 by creating a suction in the tube and is further aided by the open end 28 of the tube which is also disposed to develop a low pressure area.

The positioning of the air input nozzle 24 provides the additional advantage of being positioned close to the exhaust valves of the engine cylinders so that a substantial portion of the additional combustion which results by the mixture of air with the exhaust gases at this point occurs just before the exhaust valve has closed and applies down stroke forces to the piston which increase the engine efficiency. Furthermore, the air outlet nozzles 24 do not direct air onto the cylinder exhaust valve themselves and thus avoid any damage to these valves by reason of the injection of the cooler air from the atmosphere.

Referring now to FIG. 4, this alternate form of my invention has the same structure as the embodiment just described; however, the port 26 of the air tube 20 is connected to the drag pipe 40 of the engine rather than opening to the atmosphere behind the engine cooling fan. The drag pipe 40 communicates with the oil pan area of the engine which receives air from the atmosphere through the oil breather cap 42. In this alternate form, the air supplied through the tube 20 is already preheated to some extent by the engine heat present in the oil pan area; however, the flow of air is dependent entirely upon the suction created by the venturi effect at the air output nozzles 24 and the open end 28 of the tube.

Referring to FIG. 6, I have shown still another form of my invention, in which the air intake port 26 of the tube 20 is connected by T-coupling 44 to both the atmosphere and the drag pipe 40. This form combines the inputs utilized by the prior embodiments.

From this description of the structure and operation of my invention it will be understood that by either the preferred embodiment or the alternative forms thereof I have provided a simple, inexpensive yet highly effective device for controlling and substantially reducing the undesirable hydrocarbons ultimately passing from the exhaust of an internal combustion engine. Actual tests have indicated the effectiveness of this apparatus in achieving the advantages and performing the objects attributed to it.

I claim:

1. In an internal combustion engine for driving a motor vehicle having a cooling fan at its forward end, and an exhaust manifold with input ports connected to the engine block adjacent the cylinder exhaust valves and an elongated collection chamber interconnected between said input ports and the engine exhaust pipe, an after burning device comprising:

an elongated tube disposed in said manifold collection chamber, said tube having an input end disposed adjacent the forward end of said engine and extending externally of said manifold collection chamber into fluid communication with the atmosphere, said input end having an air receiving port disposed to receive the air stream blown rearwardly by said cooling fan and deliver said air stream into said tube, and said tube having an output end terminating internally of said manifold collection chamber adjacent the rearward end thereof, said output end being disposed in fluid communication with said collection chamber adjacent the rearward end thereof, said output end being disposed in fluid communication with said collection chamber and having an output port disposed to discharge air from said tube into the exhaust stream passing through said collection chamber and in the same direction as said exhaust stream is traveling upon passing said output port; and a plurality of cylinder exhaust air ports in said tube each located near but in spaced relationship to a different one of the cylinder exhaust valves of said engine, said cylinder exhaust air ports each having an air delivery nozzle disposed in said collection chamber adjacent the interconnection of said collection chamber with one of said manifold input ports, said air delivery nozzles each being positioned to project into the exhaust stream passing into said collection chamber from said manifold input ports and being normal to said stream whereby said exhaust stream creates by venturi effect a low pressure area at said nozzle causing air to be drawn therethrough from said tube into said exhaust stream, and said air delivery nozzles each being so positioned that said air drawn therethrough is not in fluid communication with said cylinder exhaust valves but enters said exhaust stream while said stream still has sufficient heat to permit after burning upon injection of said air.

2. An after burning device as described in claim 1 in which:

said tube is disposed substantially coaxially with said manifold collection chamber and said output port at its output end is so disposed in the exhaust stream passing through said collection manifold that said exhaust stream creates by venturi effect a low pressure area by which air is drawn from said tube into said collection chamber exhaust stream.

3. In an internal combustion engine for driving a motor vehicle having a cooling fan at its forward end, and an exhaust manifold with input ports connected to the engine block adjacent the cylinder exhaust valves and an elongated collection chamber interconnected between said input ports and the engine exhaust pipe, an after burning device comprising:

an elongated cylindrical tube disposed coaxially with said manifold collection chamber, said tube having an input end mounted in a port through the forward end of said manifold collection chamber and extending externally of said manifold collection chamber into fluid communication with the atmosphere, said input end having an air receiving port disposed to receive the air stream blown rearwardly by said cooling fan and deliver said air stream into said tube, and said tube having an output end terminating internally of said manifold collection chamber adjacent the connection of said manifold collection chamber with said engine exhaust pipe, said output end being disposed in fluid communication with said collection chamber and having an output port disposed to discharge air from said tube into the exhaust stream passing through said collection chamber and in the same direction as said exhaust stream is traveling upon passing said output port; and a plurality of cylinder exhaust air ports in said tube, each located near but in spaced relationship to a different one of the cylinder exhaust valves of said engine, said cylinder exhaust air ports each having an air delivery nozzle disposed in said collection chamber at the point of interconnection of said collection chamber with one of said manifold input ports, said air delivery nozzles each being positioned to project into the exhaust stream passing into said collection chamber from said manifold input ports and being normal to said stream whereby said exhaust stream creates by venturi effect a low pressure area at said nozzle causing air to be drawn therethrough from said tube into said exhaust stream, and said air delivery nozzles each being so positioned that said air drawn therethrough is not in fluid communication with said cylinder exhaust valves but enters said exhaust stream at a point where said exhaust stream still has sufficient heat to cause after burning upon contact with said injected air; and a one way valve disposed in the input end of said tube and actuable automatically by the pressure in said tube to permit air to pass from said air receiving port into said tube but to prevent said exhaust stream in said manifold from passing out of the input end of said tube.

4. In an internal combustion engine for driving a motor vehicle having an exhaust manifold with input ports connected to the engine block in fluid communication with the cylinder exhaust valves and an elongated collection chamber interconnecting said input ports and the engine exhaust pipe, an after burning device comprising:

an elongated tube disposed in said manifold collection chamber, said tube having an input end extending externally of said manifold collection chamber into fluid communication with an oxygenic fluid, said input end having a receiving port disposed to receive and deliver said fluid into said tube, and said tube having an output end terminating internally of said manifold collection chamber adjacent the engine exhaust pipe, said output end being disposed in fluid communication with said collection chamber and having an output port disposed to discharge said oxygenic fluid from said tube into the exhaust stream passing through said collection chamber and in the same direction as said exhaust stream is traveling upon passing said output port; and a cylinder exhaust port in said tube located near but in spaced relationship to one of the cylinder exhaust valves of said engine, said cylinder exhaust port having a delivery nozzle disposed in said collection chamber adjacent the interconnection of said collection chamber with one of said manifold input ports, said delivery nozzle being positioned to project into the exhaust stream passing into said collection chamber from said manifold input port and being normal to said stream whereby said exhaust creates by venturi effect a low pressure area at said nozzle causing oxygenic fluid to be drawn therethrough from said tube into said exhaust stream, and said delivery nozzle being so positioned that said oxygenic fluid drawn therethrough is not in fluid communication with said cylinder exhaust valves but enters said exhaust stream while said stream still has sufficient heat to permit after burning upon injection of said oxygenic fluid.

5. An after burning device as described in claim 4 in which:

said tube is disposed substantially coaxially with said manifold collection chamber said tube output end being so disposed in the exhaust stream passing through said collection manifold that said exhaust stream creates by venturi effect a low pressure area by which oxygenic fluid is drawn from said tube into said collection chamber exhaust stream.

6. An after burning device as described in claim 4 in which:

said input end of said tube also has an auxiliary input conduit interconnected with the oil pan area of said engine and disposed to supply gases therefrom to said tube in addition to said oxygenic fluid supplied by said receiving port.

7. In an internal combustion engine for driving a motor vehicle having an exhaust manifold with input ports connected to the engine block in fluid communication with the cylinder exhaust valves and an elongated collection chamber interconnecting said input ports and the engine exhaust pipe, an after burning device comprising:

an elongated tube disposed in said manifold collection chamber, said tube having an input end extending externally of said manifold collection chamber into fluid communication with an oxygenic fluid, said input end having a receiving port disposed to receive and deliver said fluid into said tube, and said tube having an output end terminating internally of said manifold collection chamber adjacent the engine exhaust pipe, said output end being disposed in fluid communication with said collection chamber and having an output port disposed to discharge said oxygenic fluid from said tube into the exhaust stream passing through said collection chamber and in the same direction as said exhaust stream is traveling upon passing said output port; and a cylinder exhaust port in said tube located near but in spaced relationship to one of the cylinder exhaust valves of said engine, said cylinder exhaust port having a delivery nozzle disposed in said collection chamber adjacent the interconnection of said collection chamber with one of said manifold input ports, said delivery nozzle being positioned to project into the exhaust stream passing into said collection chamber from said manifold input port and being normal to said stream whereby said exhaust stream creates by venturi effect a low pressure area at said nozzle causing oxygenic fluid to be drawn therethrough from said tube into said exhaust stream, and said delivery nozzle being so positioned that said oxygenic fluid drawn therethrough is not in fluid communication with said cylinder exhaust valves but enters said exhaust stream while said stream still has sufficient heat to permit after burning upon injection of said oxygenic fluid.

8. An after burning device as described in claim 7 in which:

said input end of said tube has an input conduit interconnected with the oil pan area of said engine and disposed to supply gases therefrom to said tube.

* * * * *